(12) United States Patent
Curran et al.

(10) Patent No.: US 8,431,640 B2
(45) Date of Patent: Apr. 30, 2013

(54) COMPOSITES COMPRISING BIOLOGICALLY-SYNTHESIZED NANOMATERIALS

(75) Inventors: Seamus Curran, Pearland, TX (US);
Sampath Dias, Houston, TX (US);
Werner Blau, Dublin (IE); Jun Wang, Dublin (IE); Ronald S. Oremland, Brisbane, CA (US); Shaun Baesman, San Carlos, CA (US)

(73) Assignee: University of Houston, Houston, TX (US)

( * ) Notice: Subject to any disclaimer, the term of this patent is extended or adjusted under 35 U.S.C. 154(b) by 401 days.

(21) Appl. No.: 12/610,612

(22) Filed: Nov. 2, 2009

(65) Prior Publication Data

US 2010/0160521 A1  Jun. 24, 2010

Related U.S. Application Data

(60) Provisional application No. 61/110,856, filed on Nov. 3, 2008, provisional application No. 61/111,229, filed on Nov. 4, 2008.

(51) Int. Cl.
*C08K 3/30* (2006.01)

(52) U.S. Cl.
USPC ........... 524/402; 524/439; 524/408; 977/810; 977/977; 977/773

(58) Field of Classification Search .................. 524/402
See application file for complete search history.

(56) References Cited

U.S. PATENT DOCUMENTS

2004/0241900 A1* 12/2004 Tsukamoto et al. ............ 438/82

OTHER PUBLICATIONS

Baesman, S., Bullen, T.D., Dewald, J., Zhang, D., Curran, S., Islam, F., Beveridge, T. Oremland, R. Applied and Environmental Microbiology, vol. 73, No. 7, p. 2135-2143, Apr. 2007.*
Huynh, W.H., Dittmer, J.J., Alivisatos, A. Science, vol. 295, p. 2425, 2002.*
Batabyal, S., Basu, C., Das, A.R., Sanyal, G.S. Journal of Nanoscience and Nanotechnology, vol. 6, p. 719-725, 2006.*
Zhu et al. Angew. Chem. vol. 116, p. 1434-1438, 2004.*
Sariciftci, N.S. et al., "Photoinduced Electron Transfer from a Conducting Polymer to Buckminsterfullerene", Science 258, pp. 1474-1476, (1992).
De Heer, W.A. et al, "A Carbon Nanotube Field-Emission Electron Source", Science, 270, 5239, 1179 (1995).
Curran, S. et al, "Evolution and Evaluation of the Polymer Nanotube Composite" Synthetic Met. 103, 2559 (1999).
Jung, Y.J. et al., et al, "Aligned carbon nanotube-polymer hybrid architectures for diverse flexible electronic applications" Nano Letters; 6, 3, 413-418 (2006).
Wardle, B.L. et al, "Fabrication and Characterization of Ultrahigh-Volume-Fraction Aligned Carbon Nanotube Polymer-Composites", Advanced Materials, 20, 14 2707 (2008).
Kim, P. et al., "Solution-processable high-permittivity nanocomposite gate insulators for organic field-effect transistors", Appl. Phys. Lett. 93, 013302 (2008).

(Continued)

*Primary Examiner* — Doris Lee
(74) *Attorney, Agent, or Firm* — Winstead PC

(57) ABSTRACT

The present disclosure describes composite materials containing a polymer material and a nanoscale material dispersed in the polymer material. The nanoscale materials may be biologically synthesized, such as tellurium nanorods synthesized by *Bacillus selenitireducens*. Composite materials of the present disclosure may have optical limiting properties and find use in optical limiting devices.

19 Claims, 7 Drawing Sheets

OTHER PUBLICATIONS

Zeng, Y. et al., "A novel density-tunable nanoc:omposites of CdTe quantum dots linked to dendrimer-tethered multi-wall carbon nanotubes", Spectrochimica Acta Part A Molecular and Biomolecular Spectroscopy, 70, 5, 966, (2008).

Kratschmer, W. et al.. "Solid C60: a new forrn of carbon", Nature, 347, 354-358 (1990).

Terrones, M. et al., "Controlled production of aligned-nanotube bundles", Nature 388, 52, 3 (1997).

Kim, P. et al., "Electronic Density of States of Atomically Resolved Single-Walled Carbon Nanotubes: Van Hove Singularities and End States", Phys. Rev. Lett. 82, 1225-1228 (1999).

Oremland, R.S. et al., "Structural and spectral features of selenium nanospheres produced by Se-respiring bacteria", App. Environ. Microbiol. 70: 52-60 (2004).

Baesman, S.M. et al., "Formation of tellurium nanocrystals during anaerobic growth of bacteria that use Te oxyanions as respiratory electron acceptors", Appl. Environ. Microbiol. 73: 2135-2143 (2007).

Li, C. et al. "Sensors and actuators based on carbon nanotubes and their composites: A Review", Composites and Science and Technology, 68, 6, 1227 (2008).

Curran, S. et al.. "Dynamic electrical properties of polymer Carbon Nanotube Composites: Enhancement through covalent bonding", J. Mater. Res, 21, 4, 1071 (2006).

Curran, S. et al., "Composite from Poly(m-phenylenevinylene-co-2,5-dioctozy-p-phenylenevinylene) and Carbon Nanotubes: a Novel Material for Molecular Optoelectronics", Advanced Materials, 10 1091, (1998).

Chen, P, et al., "Electronic Structure and Optical Limiting Behavior of Carbon Nanotubes", Phys. Rev. Left. 82, 12, 2548 (1999).

Tutt, L.W. and Boggess, T.F., "A review of optical limiting mechanisms and devices using organics, Fullerenes, semiconductors and other materials", Progress in Quantum Electronics 17, 4, 299 (1993).

Sun, Y.P. and Riggs, J. E., "Organic and inorganic optical limiting materials. From fullerenes to nanoparticles", International Reviews in Physical Chemistry 18, 1, 43 (1999).

Francois, L. et al., "Optical limitation induced by gold dusters: Mechanism and efficiency", Phys. Chem. Chem. Phys 3, 22, 4965 (2001).

Wang, J. and Blau, W.J., "Solvent effect on optical limiting properties of single-walled carbon nanotube dispersions", J. Phys. Chem. C 112, 7, 2298 (2008).

Switzer Blum, J., et al., "*Bacillus arsenicoselenatis* sp. nov., and *Bacillus selenitireducens* sp. nov.: two haloalkaliphiles from Mono Lake, California which respire oxyanions of selenium and arsenic", Arch. Microbiol. 171, 19, (1998).

Lee, J-H et al., "Biogenic formation of photoactive arsenic-sulfide nanotubes by *Shewanella* sp. strain HN-41", Proc. Nat'l Acad. Sci. USA 104, 20410 (2008).

Pearce, C. et al., "Microbial manufacture of chalcogenide-based nanoparticles via the reduction of selenite using *Veillonella atypica*: An in situ EXAFS study", (2008).

Vivien, L. et al., "Carbon nanotubes for optical limiting", Carbon 40, 10, 1789 (2002).

O'Flaherty, S.M. et al., "Molecular engineering of peripherally and axially modified phthalocyanines for optical limiting and nonlinear optics," Advanced Materials 15, 1, 19 (2003).

Blau, W. et al., "Reverse saturable absorption in tetraphenylporphyrins," Optics Communications 56, 1, 25-29 (1985).

Perry, J.W. et al., "Organic optical limiter with a strong nonlinear absorptive response", Science 273, 5281, 1533 (1996).

* cited by examiner

COMPOSITES COMPRISING BIOLOGICALLY-SYNTHESIZED NANOMATERIALS

CROSS-REFERENCE TO RELATED APPLICATIONS

This application claims priority to U.S. provisional patent applications 61/110,856, filed Nov. 3, 2008 and 61/111,229, filed Nov. 4, 2008, each of which is incorporated by reference herein in its entirety.

STATEMENT REGARDING FEDERALLY SPONSORED RESEARCH

This invention was made with government support under Grant Number DE-F36-08GO880008 awarded by the United States Department of Energy and Grant Number 08-EXOB08-0001 awarded by the National Aeronautics and Space Administration Exobiology Program. The government has certain rights in the invention. Additional support for the invention was provided by the United States Geological Survey and Science Foundation Ireland under grant number 08/CE/I1432.

BACKGROUND

Designed polymer composite materials containing carbon-based nanomaterials such as, for example, carbon nanotubes and fullerenes (including functionalized versions of these species), have emerged over the last decade. Such materials are referred to herein as carbon-based nanocomposites. Carbon-based nanocomposites have beneficial electrical, optical and mechanical properties due to the inclusion of the carbon-based nanomaterials. Carbon-based nanocomposites have been studied for potential uses as photovoltaics, field emission devices, conductive wires and structural members. Although there has been intense interest in carbon-based nanocomposites, development of these systems has been hampered by synthetic obstacles including, for example, yield and chirality control of the carbon-based nanomaterial filler.

Polymer composites containing inorganic materials such as, for example, glass fibers, have been known for quite some time, but designed polymer composites containing inorganic nanomaterials such as, for example, inorganic quantum dots and nanorods, have been slower to emerge. Such materials are referred to herein as inorganic-based nanocomposites. Chemical syntheses of certain inorganic nanomaterials are hampered by the same synthetic obstacles that encumber organic nanomaterial synthesis. In stark contrast to chemical syntheses, biological syntheses (particularly of inorganic materials) are known to be highly efficient, environmentally-friendly, and capable of producing structures that cannot be replicated by standard chemical methods. Further, biologically-synthesized inorganic nanomaterials may have properties that meet or exceed those of organic nanomaterials in certain applications.

In view of the foregoing, inorganic-based nanocomposites having biologically-synthesized inorganic nanomaterials dispersed in a polymer matrix may be of considerable benefit in a variety of applications. These inorganic-based nanocomposites may take advantage of property enhancements that are unique to biologically-synthesized inorganic nanomaterials.

SUMMARY

In various embodiments, the present disclosure describes composite materials including a polymer material and a biologically-synthesized nanoscale material dispersed in the polymer material. Other embodiments of composite materials described in the present disclosure involve composite materials including a polymer material and biologically-synthesized tellurium nanorods dispersed in the polymer material, wherein the biologically-synthesized tellurium nanorods have a non-linear optical limiting response. In other various embodiments, composite materials of the present disclosure are described which include a polymer material and tellurium nanorods dispersed in the polymer material.

In other various embodiments, the present disclosure also describes optical limiting devices that include a composite material containing a polymer material and tellurium nanorods dispersed in the polymer material. In some embodiments, the tellurium nanorods are biologically synthesized. In some embodiments, the tellurium nanorods are biologically synthesized by *Bacillus selenitireducens*.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
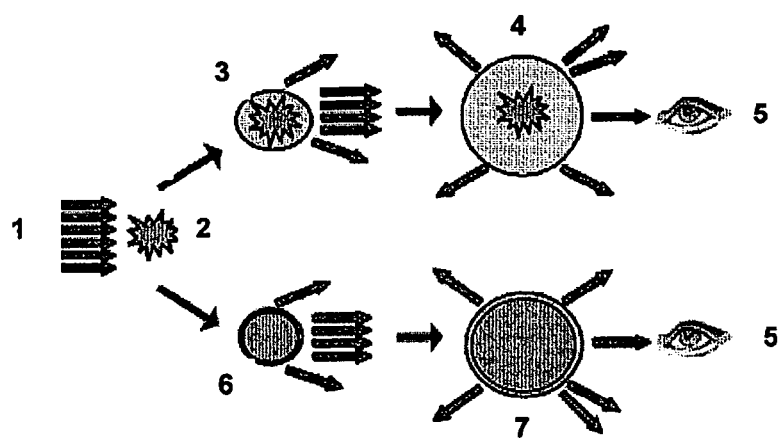
FIG. 1 shows an illustrative schematic demonstrating how scattering centers may form in composite materials of the present disclosure.

In the following description, certain details are set forth such as specific quantities, sizes, etc. so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing particular embodiments of the disclosure and are not intended to be limiting thereto. Drawings are not necessarily to scale.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 3rd Edition. Definitions and/or interpretations should not be incorporated from other patent applications, patents, or publications, related or not, unless specifically stated in this specification or if the incorporation is necessary for maintaining validity.

A plethora of biologically-synthesized minerals are known to be produced by a diverse array of bacteria and other animals. Oftentimes, such biologically-synthesized minerals acquire a particle size or crystalline state that is unattainable using standard chemical syntheses. Such biologically-synthesized minerals may embody vastly different properties than either bulk minerals or minerals produced through non-biological routes. Biological syntheses of minerals, particularly nanoscale materials, hold considerable promise for mass production of these species through an inexpensive and environmentally-benign route.

One application of biologically-synthesized nanoscale materials that has not been explored heretofore involves the preparation of composite materials. In various embodiments, the present disclosure describes composite materials including a polymer material and a biologically-synthesized nanoscale material dispersed in the polymer material. In some embodiments, the biologically-synthesized nanoscale material includes, for example, tellurium nanorods, tellurium nanospheres, selenium nanospheres, arsenic (III) sulfide nanotubes, cadmium selenide nanocrystals and zinc selenide nanocrystals. In some embodiments, the nanoscale materials are semiconductors. In other embodiments, the nanoscale materials are metallic. In still other embodiments, the nanoscale materials have optical limiting properties. In some embodiments, the optical limiting properties are non-linear in response to incident light having variable intensity.

The process of optical limiting involves limiting and attenuating the effects of intense laser pulses and other focused beams of electromagnetic radiation. Optical limiting devices are often used to lower damaging light levels passing through a material, thereby protecting the vision of an operator of a laser or other bright light source such as, for example, an arc welder. One approach to optical limiting makes use of materials whose transmittance decreases at high light levels (high intensities). For protective applications, such as those described above, the response of the optical limiter in decreasing transmittance is ideally rapid with a low saturation threshold. For optimal protection, an optical limiter ideally exhibits broadband optical limiting properties ranging from the visible to the infrared or near infrared region of the electromagnetic spectrum in some embodiments, and extending into the ultraviolet and X-ray region of the electromagnetic spectrum in other embodiments.

There are two primary mechanisms that produce optical limiting properties in composite materials. A first mechanism is non-linear absorption, and a second is non-linear scattering. Non-linear absorption can be further divided into mechanisms involving multi-photon absorption (e.g., organic molecules or crystals), reverse saturable absorption (e.g., fullerenes, phthalocyanines, porphyrins or chromaphores with heavy metals such as Ag) and free-carrier absorption (e.g, semiconductor nanoparticles or metal nanocomposites). Non-linear scattering may arise from a number of physical phenomena, such as, for example, formation of solvent bubbles as scattering centers upon exposure to intense light, ionization of nanoparticles in the composite material, and/or thermal alterations in the refractive index of the polymer matrix or organic solvents.

In various embodiments, the composite materials of the present disclosure have optical limiting properties, and in some embodiments, the optical limiting properties are non-linear. In various embodiments, the composite materials of the present disclosure exceed the optical limiting properties of other well studied optical limiting materials such as, for example, carbon nanotubes, phthalocyanines and porphyrins. In various embodiments, the optical limiting absorption properties occur with response times on the order of picoseconds.

Without being bound by theory or mechanism, it is believed that in the composite materials of the present disclosure, scattering effects play the most significant role in producing the optical limiting properties. According to Mie scattering theory, light beams are not effectively scattered by nanoscale particles alone, and the scattered intensity from Mie scattering centers is not sensitive to the wavelength of the incident light. As will be shown hereinbelow, the non-linear optical limiting properties of the composite materials of the present disclosure are wavelength sensitive.

Still without being bound by theory or mechanism, it is believed that the scattering mechanism for the composite materials of the present disclosure is based upon polymer bubble formation during microplasma formation. According to present understanding of the scattering mechanism of the optical limiting process, such polymer bubbles may form by two competing routes. FIG. 1 shows an illustrative schematic demonstrating how polymer bubble formation may occur in composite materials of the present disclosure. As shown in FIG. 1, photons 1 interact with nanoparticle 2 dispersed in a polymer matrix. According to a first mechanism, photons 1 are absorbed by nanoparticle 2, which results in transfer of thermal energy to the surrounding medium (e.g., the polymer matrix). The transfer of thermal energy results in formation of gas bubbles 3 with nanoparticle 2 as the nucleus. The initially formed gas bubbles 3 rapidly expand due to the large pressure difference at the vapor-matrix interface to produce expanded gas bubbles 4. When the size of expanded gas bubbles 4 increases to the wavelength of the incident photons 1, the expanded gas bubbles 4 effectively scatter the photons, as shown, and consequently reduce the optical transmission. In the non-limiting example shown in FIG. 1, only one of six incident photons 1 reaches the eye 5 of an observer.

Still referring to FIG. 1, in an alternate mechanism, photons 1 may interact with nanoparticle 2 to result in an ionized nanoparticle (not shown). The ionized nanoparticle subsequently forms a microplasm 6 in the polymer matrix. The energy generated by non-linear photonic vibrations and subsequent breakdown of the ionized nanoparticle results in energy transfer to the polymer matrix and formation of the microplasm 6. Rapid expansion of microplasm 6 to form expanded microplasm 7 results in the formation of scattering centers. As in the former mechanism, microplasm 7 effectively scatters photons 1, as shown, such that only a fraction of the incident light reaches the eye 5 of an observer.

Applicants have discovered that certain biologically-synthesized nanoscale materials have optical limiting behavior that may be superior to that of currently studied optical limiting materials. Certain anaerobic bacteria such as, for example, *Bacillus selenitireducens* and *Sulfurospirillum barnesii* are known to have the ability to respire oxyanions of selenium and tellurium (e.g., $TeO_3^{2-}$ and $SeO_3^{2-}$) and produce elemental selenium and tellurium having nanoscale dimensions as a respiration product. For example, *Bacillus selenitireducens* respires tellurium nanorods having diameters between about 15 and about 25 nm and lengths between about 1 μm and about 2 μm, whereas *Sulfurospirillum barnesii* produces tellurium nanospheres having a diameter on the order of 300 nm. Applicants have discovered that the tellurium nanorods, in particular, have useful nano-photonic properties including, for example, an optical limiting response, which may be non-linear in an embodiment. Accordingly, the tellurium nanorods may be dispersed into polymer materials to form composite materials which may be further used in optical limiting devices.

In any of the various embodiments containing tellurium nanorods that are described herein, the tellurium nanorods may have a length of about 1 μm to about 2 μm. The tellurium nanorods may also have a diameter of about 15 nm to about 25 nm in some embodiments, and a diameter of about 20 nm in certain other embodiments.

One of ordinary skill in the art will recognize that a wide range of polymer materials may be used in any of the composite materials of the present disclosure, depending on the intended end use of the composite material. Such polymer materials may be thermosetting or thermoplastic in various embodiments. In some embodiments, the identity of the polymer material is not particularly critical, other than that it disperses the tellurium nanorods or other nanoscale material. However, in other embodiments, the identity of the polymer material may be more important. For example, in some embodiments, the polymer material may be semiconducting. In some embodiments, the polymer material is poly[(m-phenylene vinylene)-co-(2,5-dioctyloxy-p-phenylene vinylene)] (PmPV). In certain embodiments the polymer may be, for example, poly(3-hexylthiophene) ($P_3HT$), poly(3-octylthiophene) ($P_3OT$), poly[2-methoxy-5-(2'-ethylhexyloxy-p-phenylene vinylene)] (MEH-PPV), poly[2-methoxy-5-(3,7-dimethyloctyloxy)-p-phenylene vinylene], sodium poly[2-(3-thienyl)-ethoxy-4-butylsulfonate] (PTEBS) and combinations thereof. PmPV may also be combined with any of the aforementioned polymers to make a polymer mixture.

In various embodiments, the present disclosure describes composite materials including a polymer material and biologically-synthesized tellurium nanorods dispersed in the polymer material. The biologically-synthesized tellurium nanorods have a non-linear optical limiting response. In some embodiments, the tellurium nanorods are synthesized by *Bacillus selenitireducens*.

In still other various embodiments of the present disclosure, composite materials are described that include a polymer material and tellurium nanorods dispersed in the polymer material. In some embodiments, the tellurium nanorods are biologically synthesized such as, for example, by the microorganism *Bacillus selenitireducens*. In various embodiments, optical limiting devices incorporating such composites are considered by the present disclosure. In some embodiments, a transmission response of the devices is non-linear upon exposure to electromagnetic radiation of variable intensity.

Experimental Examples

The following examples are provided to more fully illustrate some of the embodiments disclosed hereinabove. It should be appreciated by those of skill in the art that the techniques disclosed in the examples that follow represent techniques that constitute illustrative modes for practice of the disclosure. Those of ordinary skill in the art should, in light of the present disclosure, appreciate that many changes can be made in the specific embodiments that are disclosed and still obtain a like or similar result without departing from the spirit and scope of the disclosure.

Example 1

Biological Synthesis of Tellurium Nanorods with *Bacillus selenitireducens*. Biological synthesis of tellurium nanorods and characterization of such nanostructured materials have been described in S. M. Baesman, et al., "Formation of Tellurium Nanocrystals during Anaerobic Growth of Bacteria That Use Te Oxyanions as Repiratory Electron Acceptors", *Appl. Env. Microbiol.*, 73:2007, pp. 2135-2143, which is incorporated by reference herein in its entirety. Briefly, nanoscale crystals of elemental tellurium [i.e., Te(0)] were synthesized by growing the haloalkaliphilic anaerobic bacterium *Bacillus selenitireducens* strain MLS 10 in a lactate-tellurite medium. Such growth conditions result in the respiratory biochemical reduction of $TeO_3^{2-}$ to Te(0). The Te(0) first accumulates on the cell surfaces as Te-nanorods, which then aggregate and slough off into the surrounding aqueous medium as a black precipitate. The Te(0) nanorods were cleansed of cellular material and debris by ultrasonication, treatments with lysozyme, and repeated washings and centrifugations. The cleansed Te(0) nanorods were re-suspended in deionized water in a stoppered serum bottle and stored under an N, atmosphere [to preclude oxidation of Te(0) to Te(IV)] until use.

Figure 2:
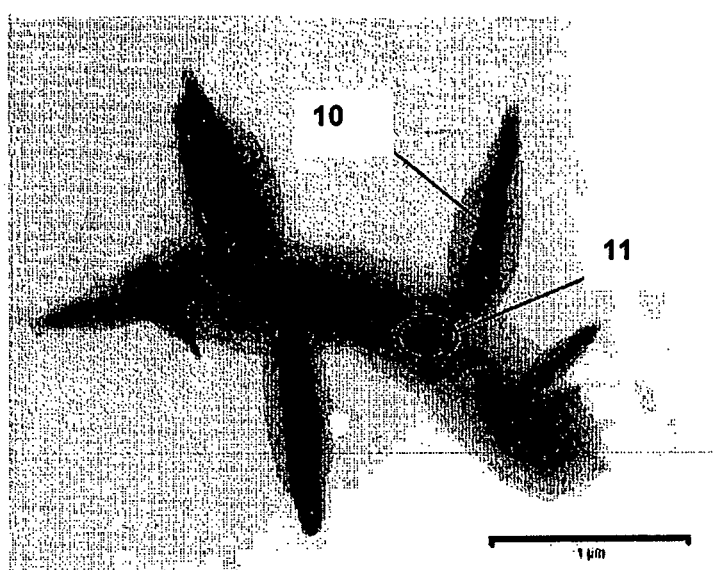
FIG. 2 shows an illustrative electron micrograph of Te nanorods on the surface of *Bacillus selenitireducens* as individuals and as shards after coalescence.
Figure 3:
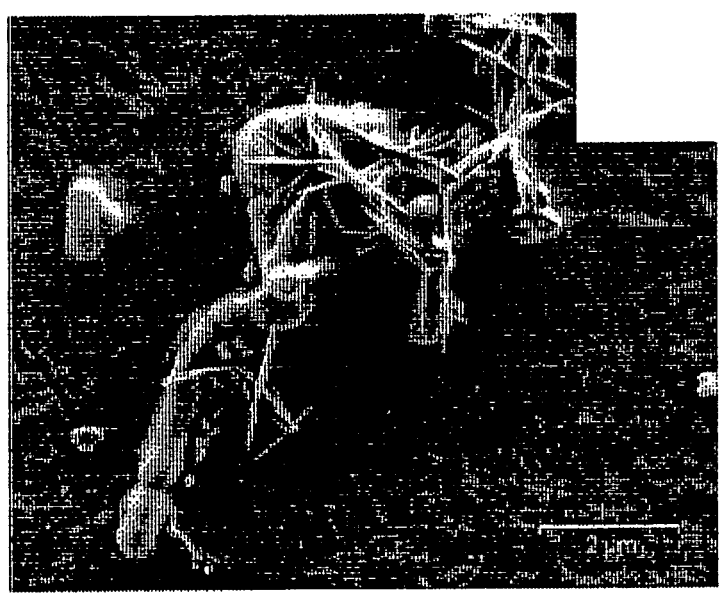
FIG. 3 shows an illustrative electron micrograph of Te nanorods in the form of "rosettes" before being sloughed from the cell surface.
Figure 4A:
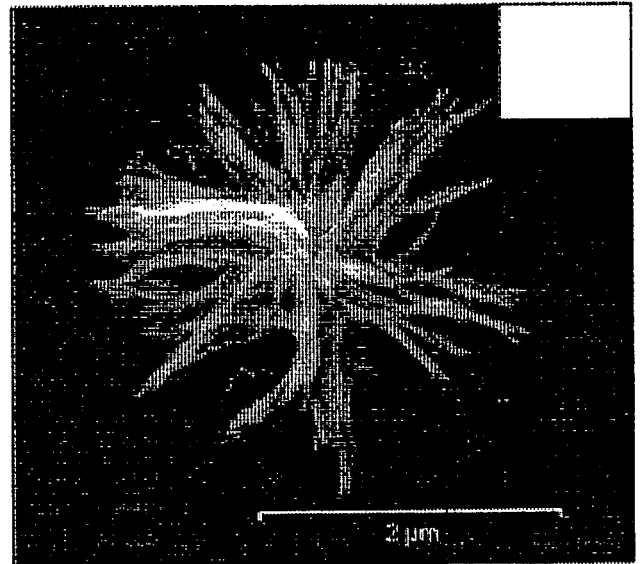
FIGS. 4A and 4B show illustrative electron micrographs of Te nanorods in the form of rosettes after cleansing to remove bacteria and cellular debris.
Figure 4B:
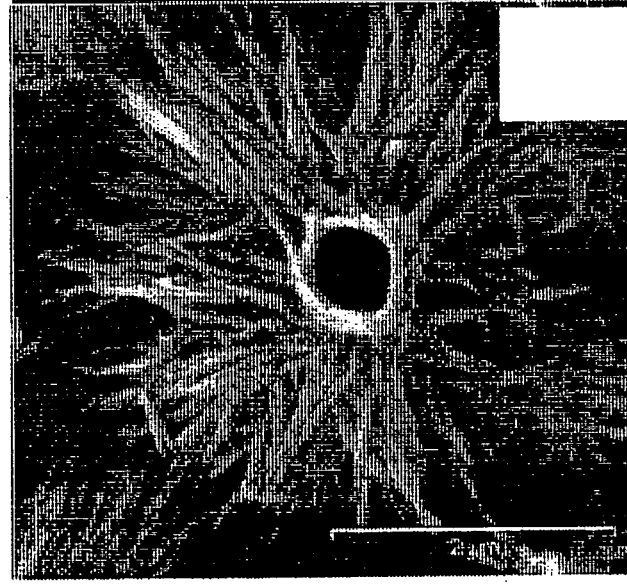

FIG. 2 shows an illustrative electron micrograph of Te nanorods on the surface of *Bacillus selenitireducens* as individuals and as shards after coalescence. As shown in FIG. 2, the respired Te(0) initially forms as thin (~19 nm×100-300 nm) individual nanorods 11 of Te(0) on the cell surface, which subsequently coalesce to form shards 10 containing intertwined nanorods. The shards 10 then slough off the cell surface, forming aggregates of star-shaped "rosettes", which contain multiple Te(0) shards. FIG. 3 shows an illustrative electron micrograph of Te nanorods in the form of "rosettes" before being sloughed from the cell surface. After sloughing, the "rosettes" are subsequently cleansed of associated bacteria and cellular debris to provide the final form of the Te nanorods used in the embodiments described herein. FIGS. 4A and 4B show illustrative electron micrographs of Te nanorods in the form of "rosettes" after cleansing to remove bacteria and cellular debris. The Te nanorods in the "rosettes" have dimensions of 20 nm in width and are 1-2 μM in length.

Example 2

Figure 5:
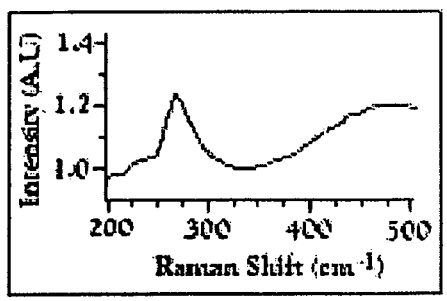
FIG. 5 shows an illustrative Raman spectrum of solid Te nanorods.
Figure 6:
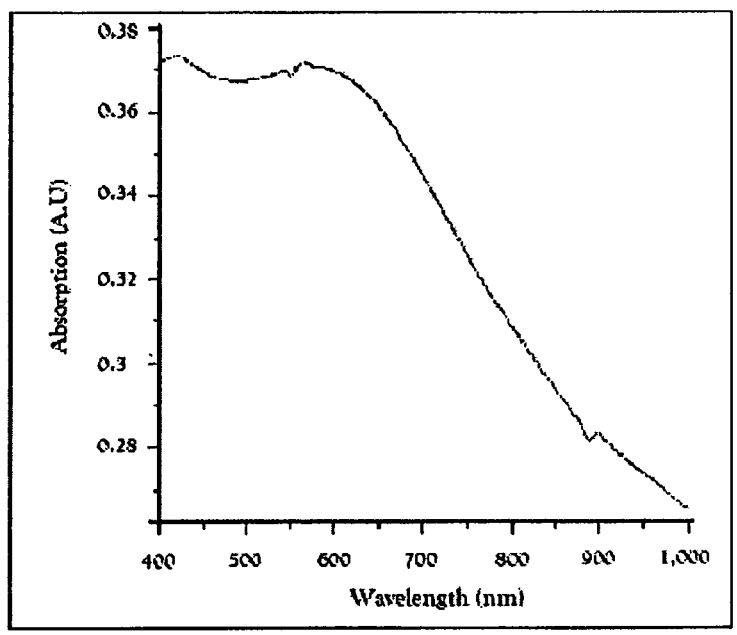
FIG. 6 shows an illustrative UV-VIS absorption spectrum of Te nanorods.

Optical Characterization of Te Nanorods and Te Nanocomposite Materials. Raman spectra were obtained using a Renishaw InVia Raman spectrometer equipped with a Raman Leica RE02 microscope. The excitation wavelength was 488 nm, produced from an air-cooled Laser-Physics $Ar^+$ laser. The Te(0) samples were first suspended in deionized water, drop-cast onto clean silicon substrates and allowed to dry before acquiring the Raman spectra. FIG. 5 shows an illustrative Raman spectrum of solid Te nanorods. Te(0) possess four zone center phonon modes, two of which are doubly degenerate (E' and E''), one non-degenerate (A1) and a second non-degenerate (A2) which is Raman silent. The second-order Raman spectrum of Te(0) has a peak at 270 cm$^{-1}$, as shown in FIG. 5, which corresponds to the second order vibrational mode of the E modes (found typically at 140 cm$^{-1}$). Te(0) adopts a trigonal geometry that corresponds to 3 tellurium atoms per unit cell, with each unit cell forming a helical chain that orientates specifically to the x-axis. There is a tendency for these chains of Te(0) unit cells to wrap themselves around each other and result in interactions between chains FIG. 6 shows an illustrative UV-VIS absorption spectrum of Te nanorods. UV-Vis absorption data were acquired using a Perkin-Elmer Lambda 20 UV/Vis spectrometer operating over a range of 350 nm-1000 nm. The Te(0) samples were suspended in deionized water, drop-cast on to clean glass microscope slides and allowed to dry before acquiring the absorption spectra.

Figures 7A, 7B:
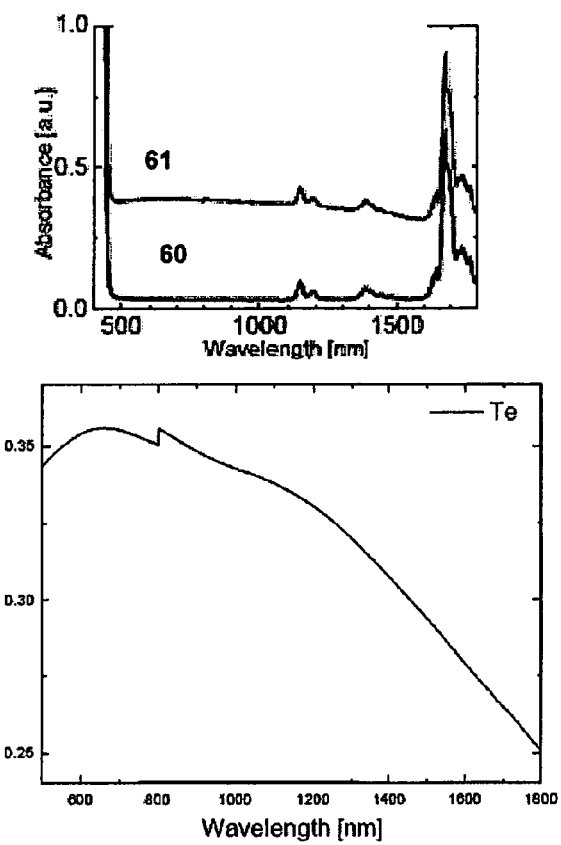
FIG. 7A shows illustrative UV/VIS absorption spectra of PmPV and a Te nanorod/PmPV nanocomposite dispersed in toluene.
FIG. 7B shows an illustrative UV/VIS absorption spectrum of Te nanorods in a Te nanorod/PmPV composite after subtracting absorption contributions from the PmPV.

To determine the absorption coefficient, a series of Te nanorod/PmPV composite solutions of differing Te(0) concentrations ranging from about 0.0 mg/mL to about 0.5 mg/mL were prepared by diluting a 0.5 mg/mL Te-PmPV solution with a 0.5 mg/mL pure PmPV solution. Linear transmittance (%) and absorbance (cm$^{-1}$) were measured in 0.1 cm quartz cuvettes using low intensity 532 nm laser pulses of 10 Hz repetition rate. FIG. 7A shows illustrative UV/VIS absorption spectra of PmPV (curve 60) and a Te nanorod/PmPV nanocomposite (curve 61) dispersed in toluene. As can be seen in FIG. 7A, strong bands characteristic of PmPV partially obscured the bands from the Te nanorods. FIG. 7B shows an illustrative UV/VIS absorption spectrum of Te nanorods in a Te nanorod/PmPV composite after subtracting absorption contributions from the PmPV. The subtraction spectrum of FIG. 7B was qualitatively similar to the UV/VIS spectrum of Te nanorods shown in FIG. 7A. Further, FIG. 7B shows that the Te nanorods are broadband absorbers, which makes them suitable for use in optical limiting materials. The absorption behavior of Te nanorod/PmPV composites followed the Beer-Lambert law. The average absorption coefficient was calculated by fitting the absorbances of all solutions, which yielded a calculated value of 8.41±0.42 mL cm$^{-1}$.

Example 3

Figure 8:
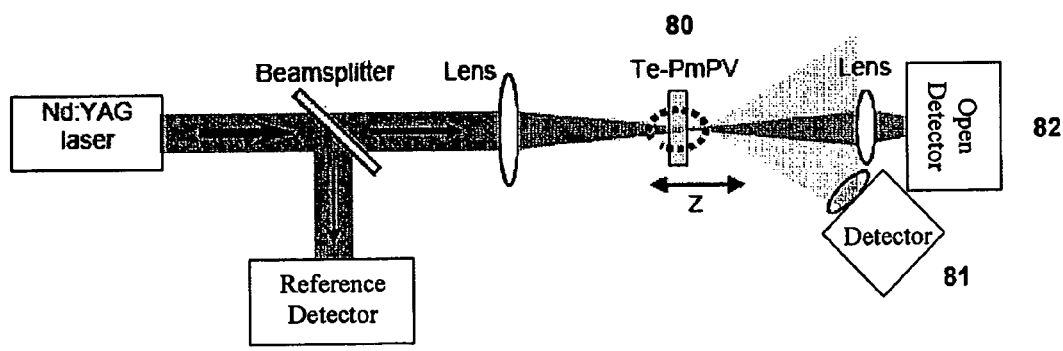
FIG. 8 shows a schematic of an illustrative z-scan measurement system.

Non-Linear Optical Measurement of Te Nanorod/PmPV Composites. For measuring non-linear scattering, z-scan experiments were performed using 6 ns pulses from a Q-switched Nd:YAG laser. FIG. 8 shows a schematic of an illustrative z-scan measurement system. As shown in FIG. 8, the total transmittance through the sample as a function of incident laser intensity was measured, while the sample was gradually moved through the focus of a lens 80 (along the z-axis). Scattered and non-scattered radiation was measured with detector 81 and open detector 82, respectively. Effective non-linear extinction coefficients including non-linear absorption and scattering were calculated by fitting the normalized transmittance as a function of position z [$T_{norm}(z)$], as given by Formula (1).

$$T_{Norm}(z) = \text{Log}_e[1+q_0(z)]/1q_0(z) \quad (1)$$

In Formula (1), $q_0(z)$ is defined by Formula (2).

$$q_0(z) = q_{00}/[1+(z/z_0)^2] \quad (2)$$

In Formula (2), $q_{00}$ is defined by Formula (3).

$$q_{00} = \beta_{eff}I_0L_{eff} \quad (3)$$

In Formula (3), $\beta_{eff}$ is the effective intensity-dependent non-linear extinction coefficient, and $I_0$ is the intensity of the light at focus. $L_{eff}$ is the effective length of the sample defined in terms of the linear absorbance $\alpha_0$ and the true optical path length L, as given in Formula (4).

$$L_{eff} = [1-e^{-\alpha_0 L}]/\alpha_0 \quad (4)$$

The effective imaginary third-order optical susceptibility $\text{Im}\{\chi^{(3)}_{eff}\}$ is directly related to $\beta_{eff}$ and is expressed as in Formula (5).

$$\text{Im}\{\chi^{(3)}_{eff}\} = n_0^2 \epsilon_0 c \lambda \beta_{eff}/(2\pi) \quad (5)$$

In Formula (5), $n_0$ is the linear refractive index, $\epsilon_0$ is the permeability of free space, c is the speed of light and $\lambda$ is the wavelength of the incident light.

Combining Formulas (1) through (5) allows the non-linear extinction coefficients to be calculated. In conducting the experiments to determine the non-linear extinction coefficients, the laser beam was spatially filtered to remove higher-order modes and tightly focused with a 9 cm focal length lens. The laser was operated at fundamental frequency of 1064 nm and a second harmonic frequency of 532 nm, with a pulse repetition rate of 10 Hz. Simultaneously, a focusing lens setup was arranged at ~30° to the direct incident beam to monitor scattered light. All samples were tested in 0.1 cm quartz cuvettes.

Figure 9A:
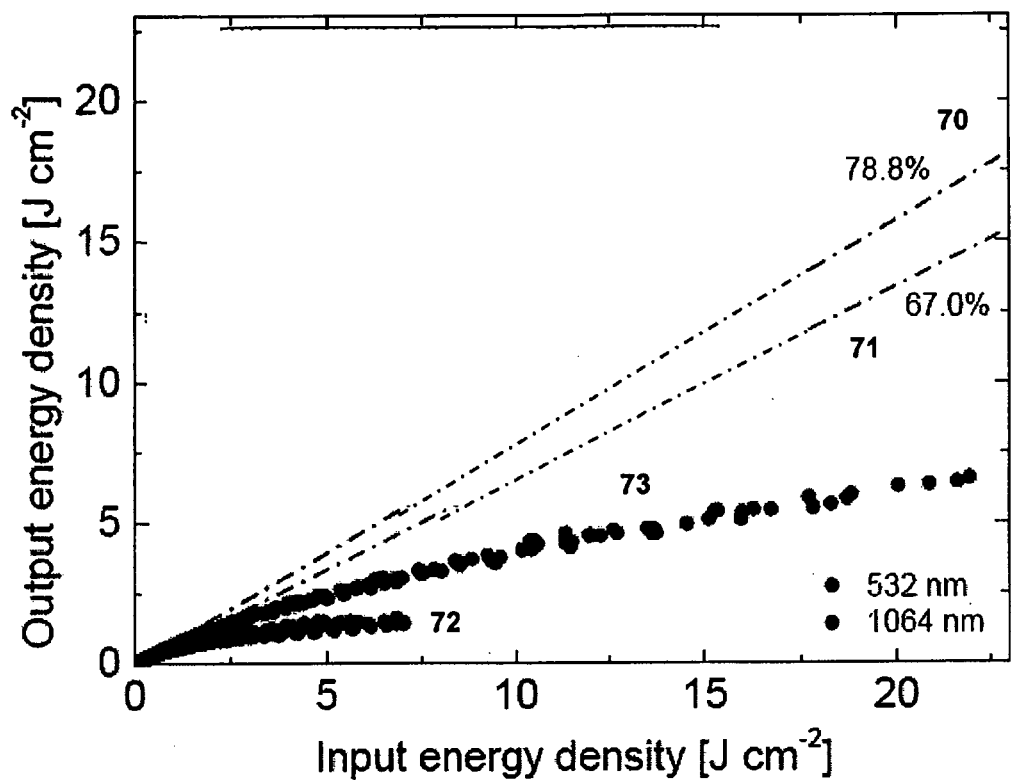
FIG. 9A shows an illustrative plot demonstrating the non-linear optical limiting response of a Te nanorod/PmPV nanocomposite at 532 nm and 1064 nm as a function of input energy density.

FIG. 9A shows an illustrative plot demonstrating the non-linear optical limiting response of a Te nanorod/PmPV nanocomposite at 532 nm (curve 72) and 1064 nm (curve 73) as a function of input energy density. In a material having a linear optical response, a plot of output energy density versus input energy density will be a straight line. However, as clearly shown in FIG. 9A, non-linear behavior was observed. For the Te nanorod/PmPV nanocomposite tested in FIG. 9A, the concentration of PmPV was 0.5 mg/mL, and the Te concentration was estimated to be ~0.28 mg/mL using the linear absorption coefficient calculated above.

FIG. 9A also shows that the Te nanorod/PmPV nanocomposite had high linear transmittances of 78.8% at 532 nm (curve 70) and 67.0% at 1064 nm (curve 71). It can be clearly seen from FIG. 9A that the Te nanorod/PmPV nanocomposite solutions exhibited exceptional optical limiting performances at both 532 nm and 1064 nm, which is characteristic of a broadband optical limiting response from the visible to the near infrared (NIR).

Figure 9B:
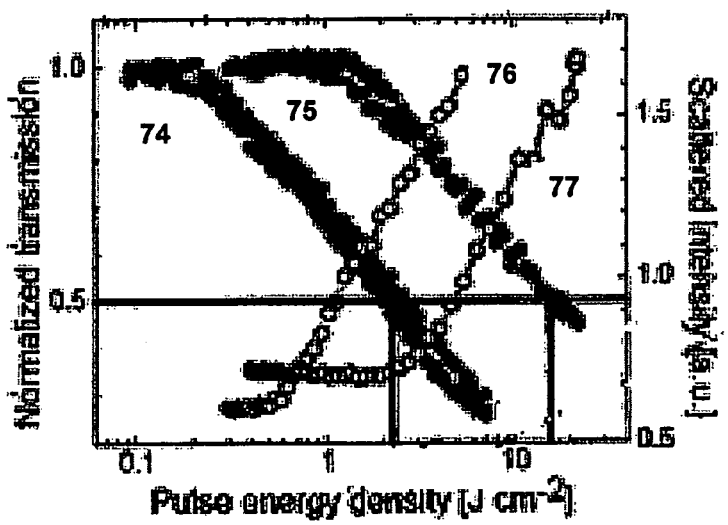
FIG. 9B shows an illustrative plot of normalized transmission versus input energy density ($J\,cm^{-2}$) in which the optical limiting threshold at which transmittance falls to 50% of the normalized linear transmittance is indicated.

The non-linear extinction coefficients $N_{eff}$, deduced from z-scan curves, were 141±14 cm GW$^{-1}$ and 21±3 cm GW$^{-1}$ at 532 nm and 1064 nm, respectively. FIG. 9B shows an illustrative plot of normalized transmission versus input energy density (J cm$^{-2}$) in which the optical limiting threshold at which when transmittance falls to 50% of the normalized linear transmittance is indicated. As shown in FIG. 9B, the optical limiting threshold at 532 nm was 2.2 J cm$^{-2}$ (curve 74) and at 1064 nm was 15.4 J cm$^{-2}$ (curve 75), as indicated by the solid lines. The scattered signals [curve 76 (532 nm) and curve 77 (1064 nm)] increased significantly along with the decrease of transmission, indicating that non-linear scattering was responsible for the optical limiting.

Increased scattering is typically synchronous with the decrease in transmission for lower concentration Te nanorod/PmPV solutions (90%). However, the delay in non-linear scattering seen in FIG. 9B was observed for higher concentration composite samples. Such a delay is believed to be due to a residual non-linear absorption mechanism (e.g., multi-photon absorption or free-carrier absorption) which becomes evident in more concentrated Te nanorod composite solutions. Nonetheless, non-linear scattering appeared to be the primary mechanism operating in the Te nanorod/PmPV composites. As a further note, the non-linear scattering effect of pristine PmPV solutions at 532 nm showed only very slight optical limiting ($\beta_{eff}$~0.2 cm GW$^{-1}$) due to two-photon absorption which is so low it can be ignored.

Example 4

Comparison of Te Nanorod/PmPV Composites to Other Optical Limiting Materials. To evaluate the optical limiting performance of Te nanorod/PmPV composites, several representative materials having known optical limiting properties were selected for experimental comparison. Well-known reverse saturable absorbers C$_{60}$ and indium phthalocyanine (tBu$_4$PcInCl) that respond favorably at an excitation wavelength of 532 nm were examined. As shown in Table 1 below, Te nanorod/PmPv composites had a larger non-linear extinction coefficient than either of these known optical limiting materials, even though the concentration of Te nanorods in the polymer composites was quite low.

TABLE 1

| Non-Linear Extinction Coefficients of Te Nanorod/PmPV and Other Optical Limiting Materials | | | | | | | |
|---|---|---|---|---|---|---|---|
| Material | Host | Conc. | T [%] | $\alpha_0$ [cm$^{-1}$] | $\beta_{eff}$ [cm GW$^{-1}$] | Im $\{\chi^{(3)}\}$ [×10$^{-11}$, esu] | Laser parameter |
| Te | PmPV in toluene | 0.28 g/L, 0.028 wt. % | 78.8 | 2.38 | 141 ± 14 | 5.32 ± 0.52 | 532 nm, 6 ns |
| C$_{60}$ | toluene | 1.8 g/L | | 2.81 | 66 ± 9 | 2.1 ± 0.4 | 532 nm, 6 ns |
| tBu$_4$PcInCl | toluene | 0.5 g/L | | 0.53 | 44 ± 9 | 1.6 ± 0.3 | 532 nm, 6 ns |
| CNTs | PmPV in toluene | 5.9 wt. % | | 3.754 | | 1.16 | 532 nm, 6 ns |
| Te | PmPV in toluene | 0.28 g/L, 0.028 wt. % | 67.0 | 4.01 | 21.1 ± 3.3 | 1.59 ± 0.25 | 1064 nm, 6 ns |
| ASPT dye | Epoxy rod | 0.004 M/L | | | 6 | | 1064 nm, 8 ns |

For optical limiting at 1064 nm, Te nanorod/PmPV was compared with a two-photon adsorption dye trans-4-[p-(N-ethyl-N-hydroxyethylamino)styryl]-N-methylpyridinium tetraphenylborate (ASPT). Under similar laser conditions, the non-linear absorption coefficient of ASPT was 6 cm GW$^{-1}$, while that of the Te nanorod/PmPV composite was as high as 21 cm GW$^{-1}$.

From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure, which is defined in the following claims.

What is claimed is the following:

1. A composite material comprising:
a polymer material; and
tellurium nanorods dispersed in the polymer material,
wherein the composite material has a non-linear optical limiting response,
wherein the non-linear optical limiting response comprises scattering;
and wherein the non-linear optical limiting response comprises intensity-dependent transmission at 532 nm and 1054 nm.

2. The composite material of claim 1, wherein the tellurium nanorods have a diameter of about 15 nm to about 25 nm.

3. The composite material of claim 1, wherein the tellurium nanorods have a diameter of about 20 nm.

4. The composite material of claim 1, wherein the tellurium nanorods have a length of about 1 µm to about 2 µm.

5. The composite material of claim 1, wherein the polymer material comprises poly[(m-phenylene vinylene)-co-(2,5-dioctyloxy-p-phenylene vinylene)] (PmPV).

6. The composite material of claim 1, wherein the polymer material comprises a semiconducting polymer.

7. The composite material of claim 6, wherein the semiconducting polymer is selected from the group consisting of poly(3-hexylthiophene) (P$_3$HT), poly(3-octylthiophene) (P$_3$OT), poly[2-methoxy-5-(2'-ethylhexyloxy-p-phenylene vinylene)] (MEH-PPV), poly[2-methoxy-5-(3,7-dimethyloctyloxy)-p-phenylene vinylene], sodium poly[2-(3-thienyl)-ethoxy-4-butylsulfonate] (PTEBS) and combinations thereof.

8. The composite material of claim 1, wherein the tellurium nanorods are biologically synthesized.

9. The composite material of claim 8, wherein the tellurium nanorods are biologically synthesized by *Bacillus selenitireducens*.

10. The composite material of claim 8, wherein the tellurium nanorods are biologically synthesized by *Bacillus selenitireducens*.

11. The composite material of claim 8, wherein the tellurium nanorods have a diameter of about 15 nm to about 25 nm.

12. The composite material of claim 2, wherein the tellurium nanorods have a diameter of about 20 nm.

13. The composite material of claim 8, wherein the tellurium nanorods have a length of about 1 µm to about 2 µm.

14. The composite material of claim 8, wherein the polymer material comprises poly[(m-phenylene vinylene)-co-(2,5-dioctyloxy-p-phenylene vinylene)] (PmPV).

15. A composite material comprising:
a polymer material; and
a biologically-synthesized nanoscale material dispersed in the polymer material,
wherein the composite material has a non-linear optical limiting response,
wherein the non-linear optical limiting response comprises scattering;
and wherein the non-linear optical limiting response comprises intensity-dependent transmission at 532 nm and 1054 nm.

16. The composite material of claim 15, wherein the biologically-synthesized nanoscale material is selected from the group consisting of tellurium nanorods, tellurium nanospheres, selenium nanospheres, arsenic (III) sulfide nanotubes, cadmium selenide nanocrystals and zinc selenide nanocrystals.

17. An optical limiting device comprising the composite material of claim 1.

18. The optical limiting device of claim 17, wherein a transmission response of the device is non-linear upon exposure to electromagnetic radiation of variable intensity.

19. The optical limiting device of claim 17, wherein the tellurium nanorods are biologically synthesized by *Bacillus selenitireducens*.

* * * * *